(12) United States Patent
Burgess et al.

(10) Patent No.: US 12,530,197 B2
(45) Date of Patent: Jan. 20, 2026

(54) VECTOR INSTRUCTION PROCESSING AFTER PRIMARY DECODE

(71) Applicant: SiFive, Inc., San Mateo, CA (US)

(72) Inventors: Bradley Gene Burgess, Sunset Valley, TX (US); David Kravitz, Cambridge, MA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/180,327

(22) Filed: Mar. 8, 2023

(65) Prior Publication Data

US 2024/0303082 A1    Sep. 12, 2024

(51) Int. Cl.
*G06F 9/30* (2018.01)
*G06F 9/38* (2018.01)

(52) U.S. Cl.
CPC ........ *G06F 9/3016* (2013.01); *G06F 9/30036* (2013.01); *G06F 9/3856* (2023.08); *G06F 9/3867* (2013.01)

(58) Field of Classification Search
CPC .............................. G06F 9/3016; G06F 9/3856
See application file for complete search history.

(56) References Cited

U.S. PATENT DOCUMENTS

| | | | | |
|---|---|---|---|---|
| 9,564,931 B1 * | 2/2017 | Nguyen | ................ | H03M 13/116 |
| 2003/0200426 A1 * | 10/2003 | Lee | ..................... | G06F 9/30181 |
| | | | | 712/210 |
| 2006/0095738 A1 * | 5/2006 | Akkary | ................ | G06F 9/3842 |
| | | | | 712/219 |
| 2013/0024653 A1 * | 1/2013 | Gove | ................... | G06F 9/30018 |
| | | | | 712/E9.033 |
| 2014/0317377 A1 * | 10/2014 | Ould-Ahmed-Vall | ...................... | |
| | | | | G06F 9/30025 |
| | | | | 712/4 |
| 2019/0340054 A1 * | 11/2019 | Boettcher | ........... | G06F 11/1637 |
| 2020/0019402 A1 * | 1/2020 | Walters | ................. | G06F 9/3013 |
| 2020/0310809 A1 * | 10/2020 | Hughes | ............... | G06F 9/30036 |
| 2023/0401060 A1 * | 12/2023 | Liu | ........................ | G06F 9/3853 |

* cited by examiner

*Primary Examiner* — Michael J Metzger

(74) *Attorney, Agent, or Firm* — Kilpatrick Townsend & Stockton LLP

(57) ABSTRACT

Apparatus and methods for cracking and processing vector instructions in a vector pipeline after decoding of a single or a first micro-operation in a main or primary pipeline are described. An integrated circuit includes a primary pipeline to decode a micro-operation from an instruction, create a reorder buffer entry in a reorder buffer for the micro-operation, responsive to a determination that the instruction is a vector instruction, send the micro-operation to a vector pipeline, and responsive to a determination that the instruction is a multiple register vector instruction, signal a vector pipeline to decode a remaining micro-operations from the instruction, and the vector pipeline to process the micro-operation, and process the remaining micro-operations when the instruction is the multiple register vector instruction.

20 Claims, 6 Drawing Sheets

VECTOR INSTRUCTION PROCESSING AFTER PRIMARY DECODE

TECHNICAL FIELD

This disclosure relates generally to central processing units or processor cores and, more specifically, to cracking and processing vector instructions in a vector pipeline after decoding of a single or a first micro-operation in a main or primary pipeline.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
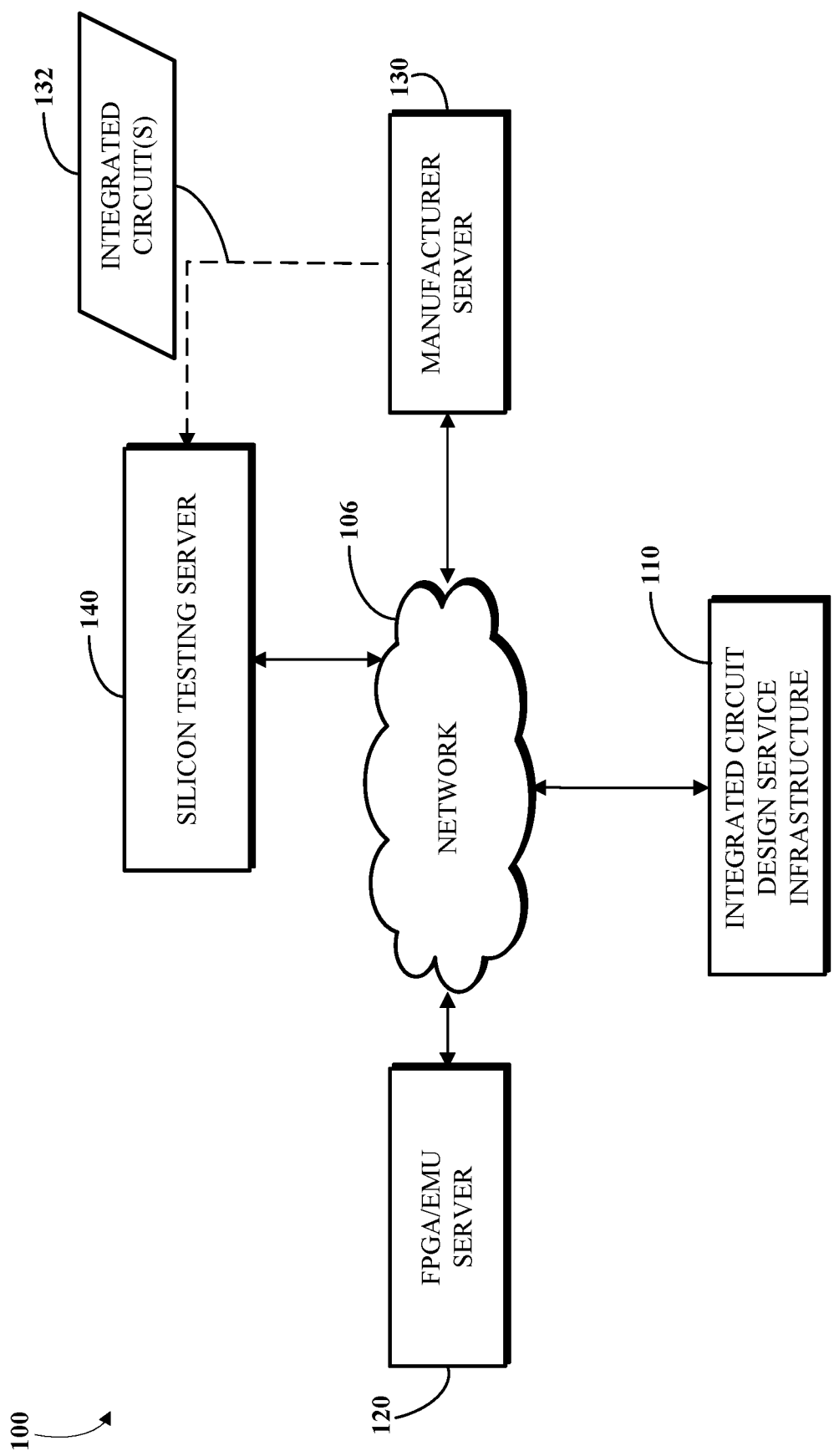
FIG. 1 is a block diagram of an example of a system for facilitating generation and manufacture of integrated circuits.

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. The pipeline may process a fetched instruction, which may be, but is not limited to, a scalar instruction and a vector instruction. Each instruction is decoded by a decoder unit into one or more micro-operations in addition to other processing. Decoding of vector instructions requires decoding and executing of vector configuration instructions to generate vector configuration information. The vector configuration information is then used to decode the vector instructions into the one or more micro-operations. In addition, due to the nature and size of vector instructions (i.e., the number of micro-operations that need to be generated), the decoding and related processing can take longer relative to scalar instruction decode processing. As a result, decoding of a vector instruction may block the decode unit or decoder from any other processing while the vector instruction micro-operation generation or expansion is being done.

Implementations described herein are designed to improve the performance of a pipelined architecture by using a dual pipeline topology. The dual pipeline topology may decouple certain of the pipeline operations as described herein. Each pipeline in the dual pipeline topology may have their own decode units, rename units, dispatch units, execution units, physical and/or virtual registers, caches, queues, data paths, and/or other logic associated with instruction flow. In the dual pipeline topology, a primary decode unit in a main or primary pipeline (collectively "primary pipeline") may detect a vector instruction. The primary decode unit may decode or crack a vector micro-operation or a first vector micro-operation (for a multiple register vector instruction) from the vector instruction. The vector micro-operation or first micro-operation may be sent by the primary decode unit to a vector renamer in a secondary pipeline. In the event the vector instruction includes multiple vector micro-operations, i.e., multiple register groups, the primary decode unit may send a signal to a vector sequencer in a secondary pipeline to decode or crack the remaining vector micro-operations from the vector instruction. The vector sequencer may send the remaining vector micro-operations to the vector renamer. The vector micro-operation and/or the first vector micro-operation and the remaining vector micro-operations may then be processed via the secondary pipeline. The vector micro-operation and/or the first vector micro-operation and the remaining vector micro-operations are not processed by the rename units and/or other stages in the primary pipeline.

In other words, in the dual pipeline topology, the primary decoder may process scalar instructions, process, in part, single register vector instructions, and/or process, in part, a first vector micro-instruction of multi-register vector instructions. All instructions are renamed prior to dispatch. For vector instruction flows, the first vector micro-operation may be provided by the primary decoder and the vector instruction moved out of the primary or scalar pipeline. The subsequent vector micro-operations may be provided (i.e., filled in) by the vector sequencer or a secondary decode unit. Moving the vector instruction out of the primary pipeline may provide a bypass to enable further primary pipeline processing of other instructions.

In some implementations, the primary pipeline and the secondary pipeline may be out-of-order pipelines. In these implementations, the primary decoder may create an entry in a reorder buffer (ROB). The primary decoder, the primary pipeline, and/or the ROB may share the entry information with the vector sequencer and/or secondary pipeline for vector instructions.

In some implementations, the primary pipeline and the secondary pipeline can be a scalar pipeline and a vector pipeline that are out-of-order pipelines. For example, an Instruction Set Architecture (ISA) (such as the RISC-V ISA) may implement scalar and vector instructions. Scalar instructions may take arguments that consist of a single element of data and vector instructions may take arguments that may include multiple elements of data to be processed by a single instruction. Scalar instructions may be implemented in the scalar pipeline and vector instructions may be implemented in the vector pipeline.

In some implementations, the scalar pipeline (which is the primary pipeline) may include a scalar decode unit, a scalar rename unit, a scalar dispatch unit, scalar execution units, and/or other logic associated with instruction flow, and the vector pipeline may include a vector decode unit, a vector rename unit, a vector dispatch unit, vector execution units, and/or other logic associated with instruction flow. In response to a determination by the scalar decode unit that an instruction is a scalar instruction, the scalar pipeline may create an entry in a ROB, decode, rename, dispatch, and execute the scalar instruction.

In response to a determination by the scalar decode unit that the instruction is a vector instruction, the scalar decode unit may create a ROB entry and perform a pass through of the vector instruction to the vector pipeline. The scalar decode unit may decode a single vector micro-operation from the vector instruction and if applicable, forego decoding and other processing of the vector instruction. The vector pipeline may decode the remaining vector micro-operations from the vector instruction using the ROB entry and vector configuration information from a processed vector configuration instruction, rename the vector operands, and execute the vector instruction or decoded vector micro-operations.

To describe some implementations in greater detail, reference is first made to examples of hardware and software structures used to implement a system including components that may facilitate dual pipeline processing. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5. The system 100 and each component in the system 100 is illustrative and can include additional, fewer, or different components which may be similarly or differently architected without departing from the scope of the specification and claims herein. Moreover, the illustrated components can perform other functions without departing from the scope of the specification and claims herein.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
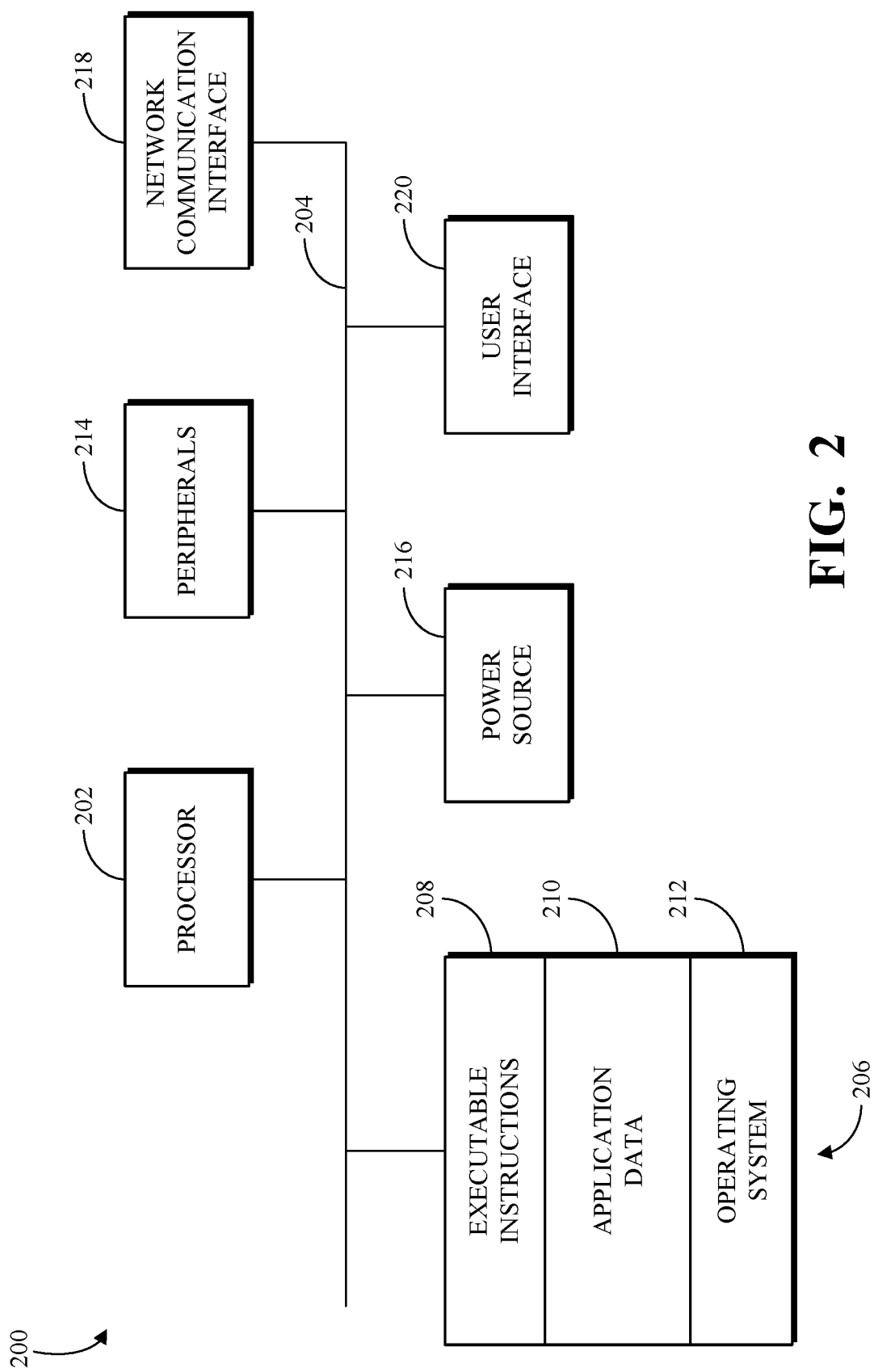
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5. The system 200 and each component in the system 200 is illustrative and can include additional, fewer, or different components which may be similarly or differently architected without departing from the scope of the specification and claims herein. Moreover, the illustrated components can perform other functions without departing from the scope of the specification and claims herein.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
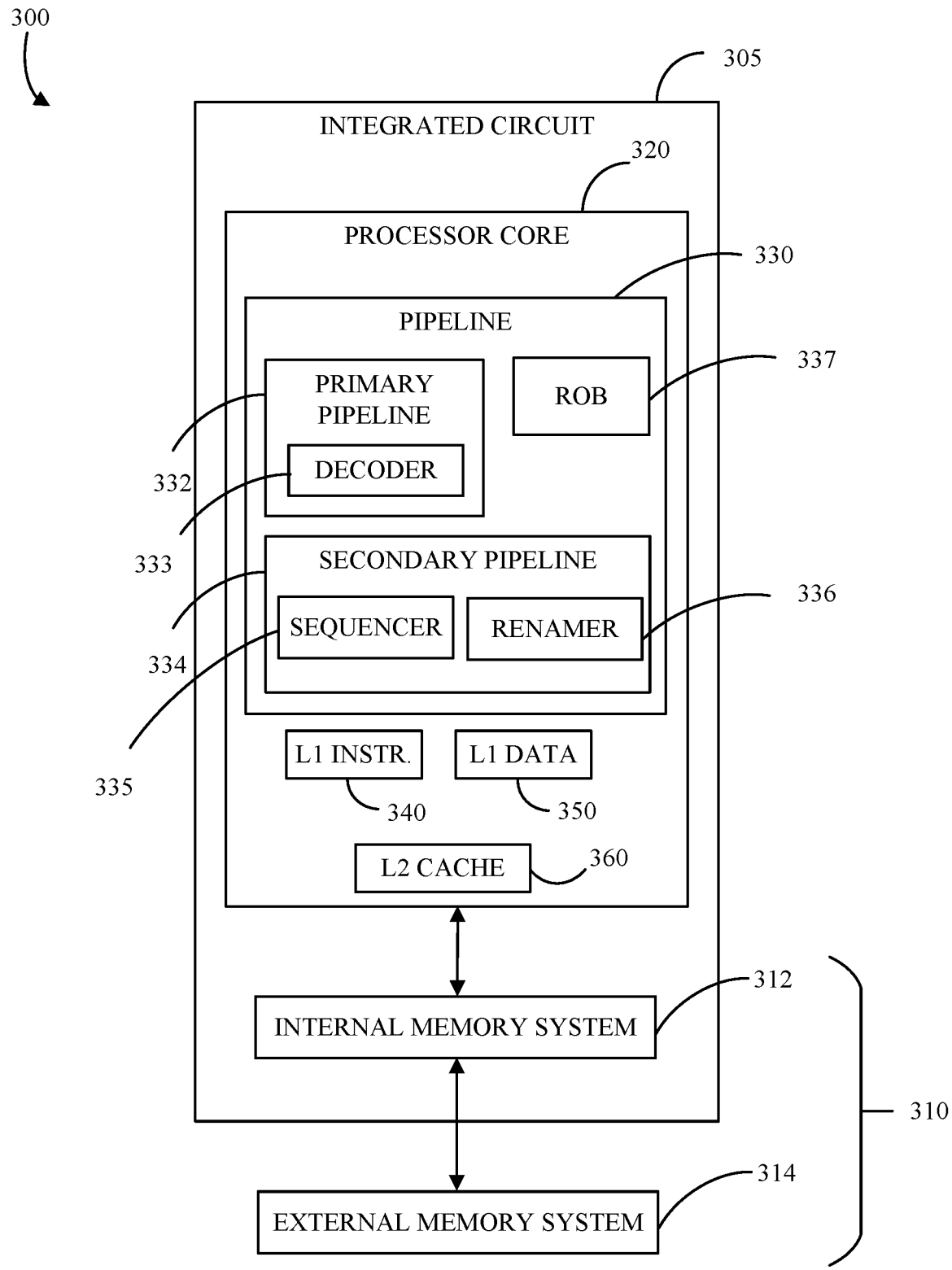
FIG. 3 is a block diagram of an example of an integrated circuit for executing scalar and vector instructions using a primary pipeline and a vector pipeline.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360.

Each of the one or more pipelines 330 may include a primary pipeline 332, a secondary pipeline 334, and a reorder buffer (ROB) 337. The primary pipeline 332 and the secondary pipeline 334 may each have separate decode units, rename units, dispatch units, execution units, physical and/or virtual registers, caches, queues, data paths, and/or other logic associated with instruction flow. The primary pipeline 332 may include, but is not limited to, a primary decoder 333. The secondary pipeline 334 may include, but is not limited to, a vector sequencer 335 and a vector renamer 336. The primary pipeline 332 and the secondary pipeline 334 may both be connected to the ROB 337. In some implementations, the primary pipeline 332 and the secondary pipeline 334 may be out-of-order pipelines. In some implementations, the primary pipeline 332 may be a scalar pipeline and the secondary pipeline 334 may be a vector pipeline.

Implementations of this disclosure are designed to improve the efficiency of processing instructions by processing some instructions from the primary decoder 333 through execution in the primary pipeline 332 and effectively passing through other instructions to the secondary pipeline 334 for processing from the vector sequencer 335 and/or vector renamer 336 through execution. Each instruction fetched by the processor core 320 may be initially input to or handled by the primary decoder 333 in the primary pipeline 332. The primary decoder 333 and/or the primary pipeline 332 may generate a ROB entry, decode, rename, dispatch, and execute an instruction upon detection or determination that the instruction is of a first type. The primary pipeline 332 may pass through the instruction to the secondary pipeline 334 upon detection or determination that the instruction is of a second type. The primary pipeline 332 may decode the second type of instruction and does not rename the second type of instruction prior to sending to the vector renamer 336 in the secondary pipeline 334. The secondary pipeline 334 may rename, dispatch, and execute with respect to the second type of instruction. The primary pipeline 332 may pass through the instruction to the secondary pipeline 334 upon detection or determination that the instruction is of a third type. The primary pipeline 332 may decode a first micro-operation of the third type of instruction, not rename the first micro-operation of the third type of instruction prior to sending to the vector renamer 336 in the secondary pipeline 334, and signal the vector sequencer 335 to decode or crack a remainder of the micro-operations associated with the third type of instruction. The secondary pipeline 334 may rename (via the vector renamer 336), dispatch, and execute with respect to the first micro-operation of the third type of instruction and the remaining micro-operations of the third type of instruction decoded by the vector sequencer 335. The primary pipeline 332, the secondary pipeline 334, and the ROB 337 coordinate use of the ROB entry as created for the first micro-operation of the third type of instruction. A ROB entry may be retired once the instruction and/or the appropriate number of micro-operations are executed.

In some implementations, the primary pipeline 332 is a scalar pipeline, the secondary pipeline 334 is a vector pipeline, the first type of instruction is a scalar instruction, the second type of instruction is a vector instruction with one micro-operation, and the third type of instruction is a vector instruction with multiple micro-operations.

Figure 4:
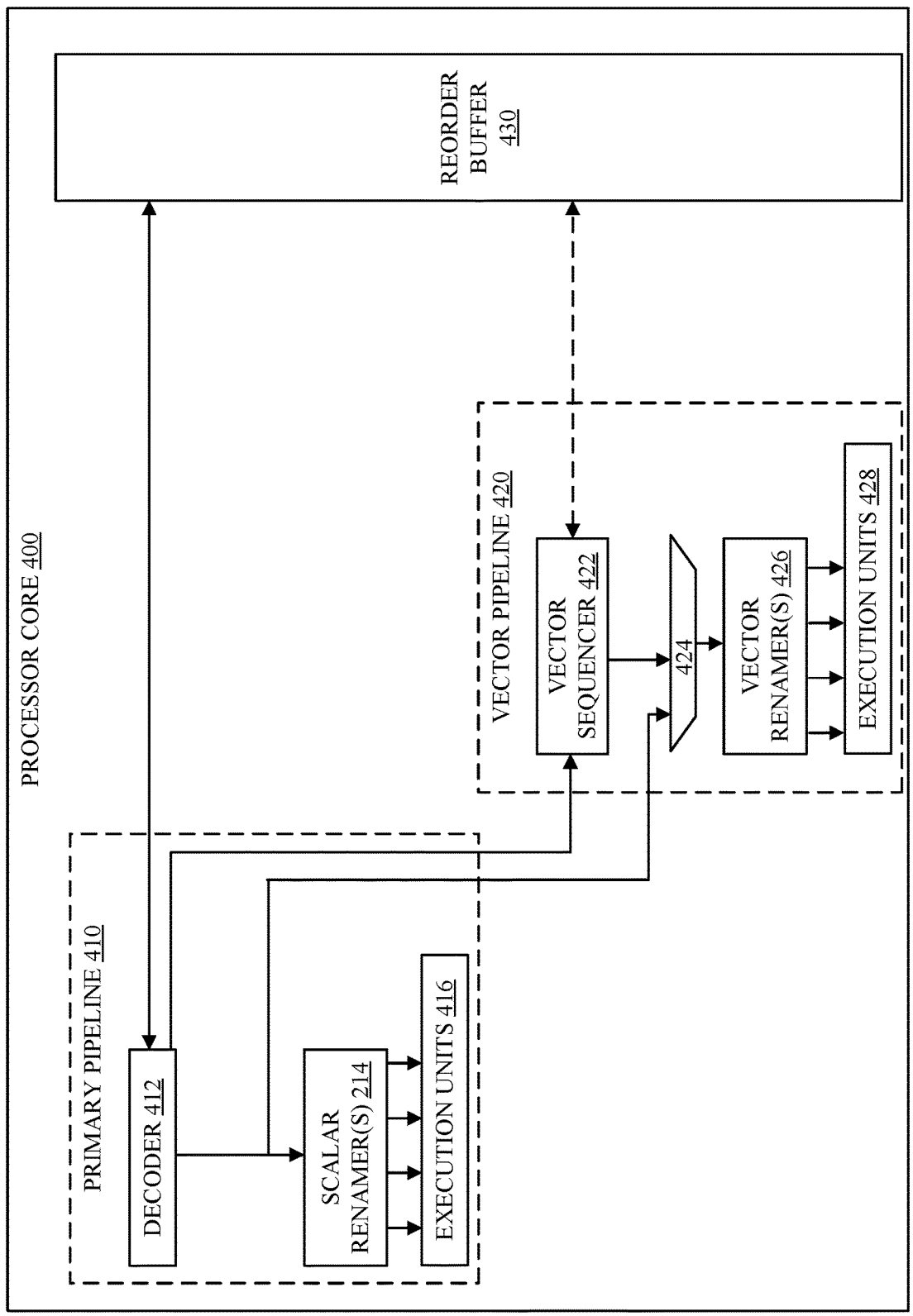
FIG. 4 is a block diagram of an example of dual pipelines in a processor core executing scalar and vector instructions.

In some implementations, a vector instruction can include scalar sources and/or destinations. In these instances, the primary pipeline 332 or scalar pipeline can rename the scalar operands and the vector pipeline can rename the vector operands. In these instances, an internal transfer buffer (as shown in FIG. 4) may be utilized to synchronously transfer data between the scalar and vector pipelines. In some implementations, the scalar operands from the vector instruction may be sent to execution units in the vector pipeline via the internal transfer buffer. The vector instruction is executed in the vector pipeline.

In some implementations, for a vector configuration instruction, the scalar pipeline may create an entry in the ROB 337, decode, rename, dispatch, and execute the vector configuration instruction as the scalar pipeline has access to configuration status registers not accessible by the vector pipeline. The scalar pipeline may send vector configuration information resulting from execution of the vector configuration instruction to the vector sequencer 335 and/or vector pipeline. The vector pipeline may wait to execute the vector instructions until execution of the vector configuration instruction and receipt of the vector configuration information.

The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

FIG. 4 is a block diagram of an example of dual pipelines in a processor core 400 executing scalar and vector instructions. The processor core 400 may be like the processor core 320 shown in FIG. 3. The processor core 400 may implement a microarchitecture. The processor core 400 may be configured to fetch, decode, rename, dispatch, and execute instructions of an instruction set instruction set architecture (ISA) (e.g., the RISC-V instruction set) in pipelined data paths like the one or more pipelines 330 shown in FIG. 3. The instructions may execute speculatively and out-of-order in the processor core 400. The processor core 400 may be a compute device, a microprocessor, a microcontroller, or a semiconductor intellectual property (IP) core or block. The processor core 400 may be implemented by an integrated circuit like the integrated circuit 305 shown in FIG. 3. In some implementations, the processor core 400 may be implemented by the integrated circuit with one or more additional processor cores in a cluster that is connected via an interconnection network.

The processor core 400 may implement components of the microarchitecture (e.g., dispatch units, execution units, vector units, registers, caches, queues, data paths, and/or other logic associated with instruction flow as discussed herein). For example, the processor core 400 may include a primary pipeline 410 connected to or in communication (collectively "connected") a vector pipeline 420, each of which are connected to a ROB 430.

The primary pipeline 410 may include a decoder 412 connected to the ROB 430 and to a renamer(s) 414, which in turn is connected to other components including, but not limited to, execution units 416. The primary pipeline 410 and components therein may be configured to determine an instruction type, process scalar instructions, process vector configuration instructions, and/or process in part or partially process, scalar operands of a vector instruction, and/or a vector micro-operation as described herein. The decoder 412 may create an entry in the ROB 430 for an instruction. In implementations, the decoder 412 may decode a single or a first micro-operation for a single register vector instruction or a multiple register vector instruction, respectively, and create an entry in the ROB 430 accordingly.

The vector pipeline 420 may include a vector sequencer 422 connected to a vector renamer(s) 426 via a multiplexor 424, which in turn is connected to other components including, but not limited to, execution units 428. The decoder 412 may be connected to the vector renamer(s) 426 via the multiplexor 424, and connected to the vector sequencer 422. The vector pipeline 420 and components therein may be configured to process vector instructions.

The primary pipeline 410 and the vector pipeline 420 may implement a split instruction decode where machine state dependent instruction decoding and/or sequencing (i.e., cracking) may be done later in the vector pipeline 420 for vector instructions having more than one micro-operation. The vector sequencer 422 may coordinate with the primary pipeline 410 and/or the ROB 430 regarding the ROB created for the single or first micro-operation so as to process the vector instruction. In implementation, the primary pipeline 410 and the vector pipeline 420 may implement split renaming.

Operationally, upon determination of a scalar instruction by the decoder 412, the decoder 412 may decode the scalar instruction into micro-operation(s), the renamer(s) 414 may rename the scalar operands, and the execution units 416 may execute the micro-operation(s). The decoder 412 may generate an entry(ies) in the ROB 430 for the micro-operation(s). The ROB entry may be retired upon completion of the micro-operation(s).

Operationally, upon determination of a single register vector instruction by the decoder 412, the decoder 412 may decode the vector instruction into a vector micro-operation, create a ROB entry, and send the decoded vector micro-operation to the vector renamer(s) 426, via the multiplexor 424, for processing in the vector pipeline 420. The primary pipeline 410 foregoes renaming and further processing of the vector micro-operation. The primary pipeline 410 may decode and resolve a vector configuration instruction, such as a VSET instruction in the RISC-V ISA, and send the vector configuration information to the vector pipeline 420 so that the vector micro-operation may be processed. The ROB entry may be coordinated as between the primary pipeline 410, the vector pipeline 420, and/or the ROB 430. In implementations, the ROB entry may be coordinated as between the decoder 412, vector sequencer 422 and/or the ROB 430. In implementations, the ROB entry may be coordinated as between the vector sequencer 422 and the ROB 430. The ROB entry may be retired upon completion of the micro-operation(s).

Operationally, upon determination of a multiple register vector instruction by the decoder 412, the decoder 412 may decode a first vector micro-operation from the vector instruction into a, create a ROB entry, send the decoded first vector micro-operation to the vector renamer(s) 426, via the multiplexor 424, and signal the vector sequencer(s) p422 to decode the other vector micro-operations from the vector instruction. The primary pipeline 410 foregoes further decoding of the vector instruction. The primary pipeline 410 may decode and resolve a vector configuration instruction, such as a VSET instruction in the RISC-V ISA, and send the vector configuration information to the vector sequencer 422 so that the other vector micro-operations may be decoded. Moreover, the first vector micro-operation and the other vector micro-operations may be processed in the vector pipeline 420 using the vector configuration information. The ROB entry may be coordinated and retired as described herein.

Table 1 shows an example of vector cracking, vector decoding, or vector sequencing, i.e., micro-operation generation from a vector instruction. In this instance, the vector operation is a vector add which is decoded into 8 micro-operations.

TABLE 1

Note: Not all configuration is provided for ease of illustration.
LMUL = 8, where LMUL specifies the number of vector registers that are grouped
Macro instruction: vadd.vv v16, v8, v0
Micro-op:
- vadd.vv v16, v8, v0
- vadd.vv v17, v9, v1
- vadd.vv v18, v10, v2
- vadd.vv v19, v11, v3
- vadd.vv v20, v12, v4
- vadd.vv v21, v13, v5
- vadd.vv v22, v14, v6
- vadd.vv v23, v15, v7

The processing core 400 and each component in the processing core 400 is illustrative and can include additional, fewer, or different components which may be similarly or differently architected without departing from the scope of the specification and claims herein. Moreover, the illustrated components can perform other functions without departing from the scope of the specification and claims herein.

Figure 5:
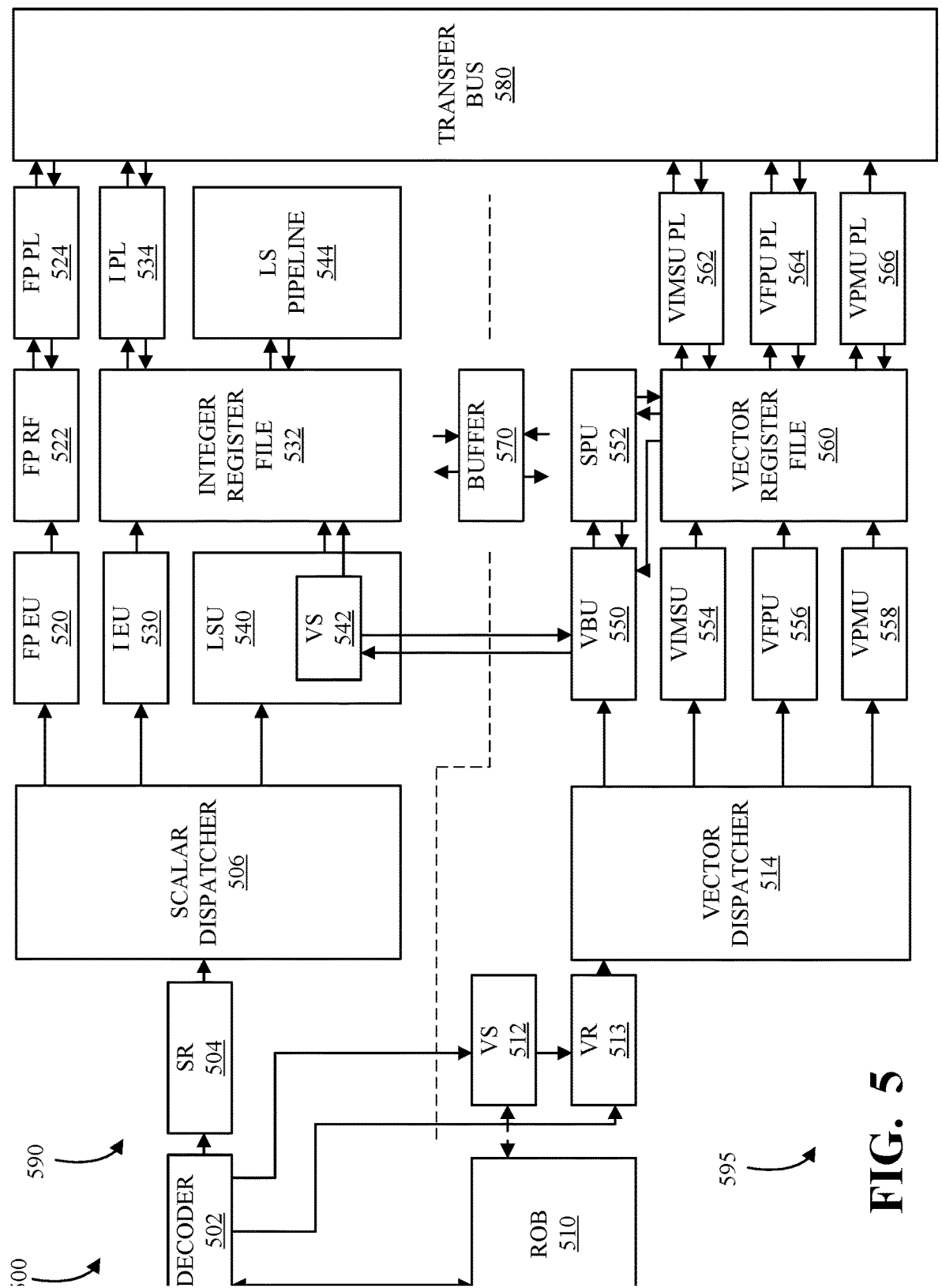
FIG. 5 is a block diagram of an example of dual pipelines with associated circuitry in a processor core executing scalar and vector instructions.

FIG. 5 is a block diagram of an example of dual pipelines with associated circuitry in a processor core 500 executing scalar and vector instructions. The processor core 500 may be like the processor core 320 shown in FIG. 3 and the processor core 400 of FIG. 4. The processor core 500 may implement a microarchitecture. The processor core 500 may be configured to fetch, decode, rename, dispatch, and execute instructions of an instruction set instruction set architecture (ISA) (e.g., the RISC-V instruction set) in pipelined data paths like the one or more pipelines 330 shown in FIG. 3. The instructions may execute speculatively and out-of-order in the processor core 500. The processor core 500 may be a compute device, a microprocessor, a microcontroller, or a semiconductor intellectual property (IP) core or block. The processor core 500 may be implemented by an integrated circuit like the integrated circuit 305 shown in FIG. 3. In some implementations, the processor core 500 may be implemented by the integrated circuit with one or more additional processor cores in a cluster that is connected via an interconnection network.

The processor core 500 may implement components of the microarchitecture (e.g., dispatch units, execution units, vector units, registers, caches, queues, data paths, and/or other logic associated with instruction flow as discussed herein). For example, the dual pipelines of the processor core 500 may include a primary pipeline 590 connected to or in communication (collectively "connected") a vector pipeline 595, where each of the primary pipeline 590 and the vector pipeline 595 are connected to a ROB 510, an internal transfer buffer 570, and a transfer bus 580.

The primary pipeline 590 may include a decoder 502 connected to the ROB 510 and a scalar renamer 504, which in turn is connected to a dispatcher 506. The dispatcher 306 may be connected to a floating point path which includes a floating point execution unit 520, a floating point register file 522, and a floating point pipeline 524. The dispatcher 506 may be connected to an integer path which includes an integer execution unit 530, an integer register file 532, and an integer pipeline 534. The dispatcher 506 may be connected to a load store path which includes a load/store unit 540, the integer register file 532, and a load store pipeline 544. Outputs of the floating point pipeline 524 and the integer pipeline 534 are connected to the transfer bus 580, and the outputs of the floating point pipeline 524, the integer pipeline 534, and the load store pipeline 544 are connected to the floating point register file 522 and the integer register file 532, respectively. The primary pipeline 590 and components therein may be configured to execute scalar instructions.

The vector pipeline 595 may include a vector sequencer 512 connected to the ROB 510 and a vector renamer 513, which in turn is connected to a vector dispatcher 514. The decoder 502 may be connected to the vector renamer 513 and the vector sequencer 512. The vector dispatcher 514 may be connected to a vector baler unit 550, which in turn is connected to a vector sequencer 542 in the load/store unit 540 and to a segment permute unit 552, which is further connected to a vector register file 560. The vector dispatcher 514 may be connected to a vector integer/move/slide unit 554, which in turn is connected to the vector register file 560. The vector dispatcher 514 may be connected to a vector floating point unit 556, which in turn is connected to the vector register file 560. The vector dispatcher 514 may be connected to a vector permute/mask unit 558, which in turn is connected to the vector register file 560. The vector register file 560 is connected to a vector integer/move/slide pipeline 562, a vector floating point pipeline 564, and a vector permute/mask pipeline 566. The outputs of the vector integer/move/slide pipeline 562, the vector floating point pipeline 564, and the vector permute/mask pipeline 566 are connected to the transfer bus 580. The vector pipeline 595 and components therein may be configured to execute vector instructions.

Operationally, upon determination of a scalar instruction, the decoder 502 may decode the scalar instruction into micro-operations and create a ROB entry in the ROB 510, the scalar renamer 504 may rename the scalar operands, the dispatcher 506 may dispatch the micro-operations via one or more of the floating point path, the integer path, and/or the load store path.

Operationally, upon determination of a single register vector instruction, the decoder 502 may decode the micro-operation from the vector instruction, create a ROB entry in the ROB 510, and send the micro-operation to the vector renamer 513. The scalar renamer 304 foregoes renaming the vector operands. The vector renamer 513 may rename the vector operands, the vector dispatcher 514 may dispatch the micro-operation to one or more of the vector baler unit 550, the vector integer/move/slide unit 554, the vector floating point unit 556, and/or the vector permute/mask unit 558 for processing through the segment permute unit 552, the vector register file 560, the vector integer/move/slide pipeline 562, the vector floating point pipeline 564, and/or the vector permute/mask pipeline 566 for execution, as appropriate and applicable. The primary pipeline 590 may decode and resolve a vector configuration instruction, such as a VSET instruction of the RISC-V ISA), and send the vector configuration information to the vector pipeline 595 for processing of the micro-operation. The ROB entry may be coordinated and retired as described herein.

Operationally, upon determination of a multiple register vector instruction, the decoder 502 may decode a first micro-operation from the vector instruction, create a ROB entry in the ROB 510, send the micro-operation to the vector renamer 513, and signal the vector sequencer 512 to decode the remaining micro-instructions from the vector instruction. The decoder 502 foregoes decoding the remaining micro-instructions. The scalar renamer 304 foregoes renaming the vector operands. The vector sequencer 512 may decode the remaining micro-operations. The primary pipeline 590 may decode and resolve a vector configuration instruction, such as a VSET instruction of the RISC-V ISA), and send the vector configuration information to the vector sequencer 512 for decoding of the micro-operation. The ROB entry may be coordinated and retired as described herein. The vector renamer 513 may rename the vector operands, the vector dispatcher 514 may dispatch the micro-operation to one or more of the vector baler unit 550, the vector integer/move/slide unit 554, the vector floating point unit 556, and/or the vector permute/mask unit 558 for processing through the segment permute unit 552, the vector register file 560, the vector integer/move/slide pipeline 562, the vector floating point pipeline 564, and/or the vector permute/mask pipeline 566 for execution, as appropriate and applicable.

Operationally, vector load and store instructions are different in that the load/store unit 540 does not directly deal with vector register renaming and is instead handled by the vector baler unit 550. In these instances, the decoder 502 may send only one load or store micro-operation down the primary pipeline 590. For loads having multiple registers or register groups, the load/store unit 540 may sequence thru the accesses returning multiple registers to the vector baler unit 550. In the vector pipeline 595, the vector sequencer 512 will have cracked the vector instruction into multiple vector micro-operations which will be scheduled to the vector baler unit 550 and write the appropriate register. Stores would work similarly in that the vector baler unit 550 would send store data to the load/store unit 540 as it becomes available. For the load/store unit 540, the producer/consumer messaging would be started with the passing of a mask from the vector baler unit 550. The ROB entry may be coordinated and retired as described herein.

The processing core 500 and each component in the processing core 500 are illustrative and can include additional, fewer, or different components which may be similarly or differently architected without departing from the scope of the specification and claims herein. Moreover, the illustrated components can perform other functions without departing from the scope of the specification and claims herein.

Figure 6:
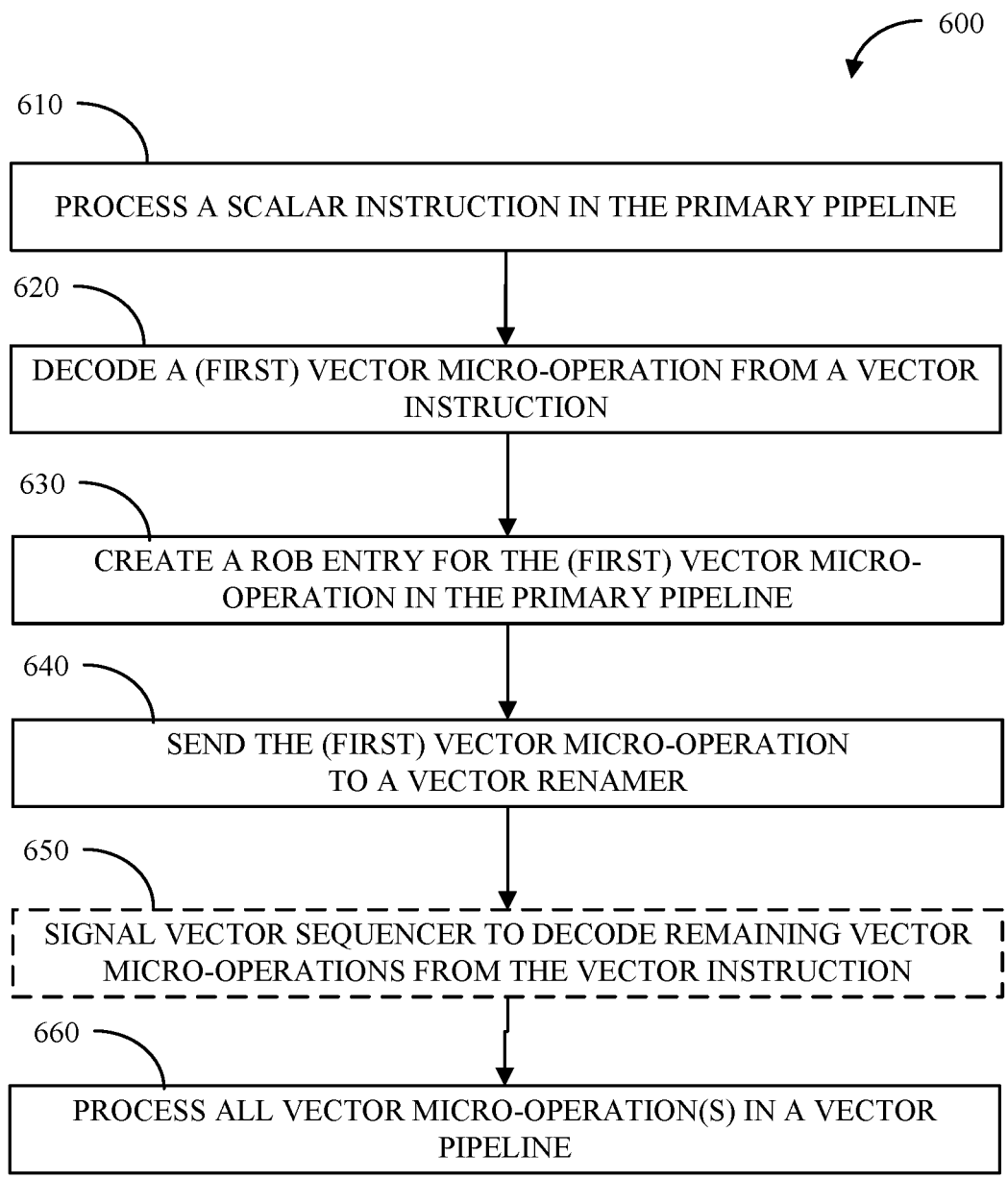
FIG. 6 is a flow chart of a method for cracking and processing vector instructions in a vector pipeline after decoding of a single or a first micro-operation in a main or primary pipeline.

FIG. 6 is a flow chart of a method 600 for cracking and processing vector instructions in a vector pipeline after decoding of a single or a first micro-operation in a main or primary pipeline. The method 600 may include: processing 610 in a primary pipeline for a first instruction type; decoding 620 a micro-operation in a primary pipeline from a second or third instruction type; creating 630 a ROB entry for the micro-instruction in the primary pipeline; sending 640 the micro-instruction to a vector renamer in the instance of a second instruction type; signaling 650 a vector sequencer to decode a remaining micro-instructions for the third type of instruction; and processing 660 the micro-instruction and/or the remaining micro-instructions in a vector pipeline. The method 600 may be performed in the system 300 of FIG. 3, the processor core 400 of FIG. 4, and/or the processor core 500 of FIG. 5.

The method 600 may include processing 610 in a primary pipeline for a first instruction type. A system, an integrated circuit, and/or a processor may include a primary pipeline and vector pipeline. In some implementations, the primary pipeline and/or the vector pipeline may be connected to a ROB. In the event that a fetched instruction is a first instruction type, i.e., a scalar instruction, the primary pipeline may process the instruction including, but not limited to, decode, generate a ROB entry, rename, dispatch, execute the scalar instruction, and retire the ROB entry upon execution completion.

The method 600 may include decoding 620 a (first) micro-operation in a primary pipeline from a second or third instruction type. The primary pipeline may decode a micro-operation from the second type of instruction, i.e., a single register vector instruction. That is, the instruction is a vector instruction that has one vector micro-operation. The primary pipeline may decode a first micro-operation from the third type of instruction, i.e., a multiple register vector instruction. That is, the instruction is a vector instruction that has multiple vector micro-operations and the primary pipeline may decode only the first micro-operation.

The method 600 may include creating 630 a ROB entry for the (first) micro-instruction in the primary pipeline. The primary pipeline may create a ROB entry in the ROB for the micro-operation or the first micro-operation, as appropriate.

The method 600 may include sending 640 the (first) micro-instruction to a vector renamer. The primary pipeline may send the micro-operation or the first micro-operation, as appropriate, to a renamer in the secondary pipeline, i.e., a vector pipeline. The primary pipeline foregoes any further processing with respect to the micro-operation, the first micro-operation, the second type of instruction, and/or the third type of instruction, as appropriate.

The method 600 may include signaling 650 a vector sequencer to decode a remaining micro-operations in the instance of the third type of instruction. The primary pipeline my signal a vector sequencer in the secondary pipeline in the event the instruction is the third type of instruction. That is, the third type of instruction is forwarded or sent to the vector sequencer. The vector sequencer may use the vector configuration information to decode the remaining micro-operations from the third type of instruction. The vector sequencer may send the remaining micro-operations to the renamer in the secondary pipeline.

The method 600 may include processing 660 the (first) micro-instruction and/or the remaining micro-instructions in a vector pipeline. The primary pipeline may send vector configuration information to the secondary pipeline to facilitate processing of the micro-operation, the first micro-operation, the remaining micro-instructions, the second type of instruction, and/or the third type of instruction, as appropriate. The ROB entry may be coordinated between the primary pipeline, the secondary pipeline, and/or the ROB to facilitate processing of the micro-operation, the first micro-operation, the remaining micro-instructions, the second type of instruction, and/or the third type of instruction, as appropriate. The secondary pipeline processing may include, but is not limited to, dispatching, executing the micro-operations including the micro-operation, the first micro-operation, and/or the remaining micro-instructions, as appropriate, and retire the ROB entry(ies) upon execution completion.

Described herein is an integrated circuit which includes a primary pipeline and a vector pipeline. The primary pipeline is configured to decode a micro-operation from an instruction, create a reorder buffer entry in a reorder buffer for the micro-operation, responsive to a determination that the instruction is a vector instruction, send the micro-operation to the vector pipeline, and responsive to a determination that the instruction is a multiple register vector instruction, signal the vector pipeline to decode a remaining micro-operations from the instruction. The vector pipeline is configured to process the micro-operation, and process the remaining micro-operations when the instruction is the multiple register vector instruction.

With respect to the integrated circuit, in implementations, a decode unit in the primary pipeline is configured to send the micro-operation to the vector pipeline. In implementations, a decode unit in the primary pipeline is configured to send the micro-operation to a vector renamer unit in the vector pipeline. In implementations, the decode unit in the primary pipeline is configured to signal a vector sequencer in the vector pipeline. In implementations, a renamer unit in the primary pipeline foregoes renaming the micro-operation. In implementations, the decode unit in the primary pipeline foregoes decoding the remaining micro-operations when the instruction is the multiple register vector instruction. In implementations, the primary pipeline is further configured to process a vector configuration instruction to generate vector configuration information, and the vector pipeline is further configured to process the micro-operation upon receipt of the vector configuration information, and process the remaining micro-operations upon receipt of the vector configuration information when the instruction is the multiple register vector instruction. In implementations, the vector pipeline is further configured to dispatch and execute the micro-operation, and dispatch and execute the remaining micro-operations when the instruction is the multiple register vector instruction. In implementations, the reorder buffer entry is coordinated between the primary pipeline, the vector pipeline, and the reorder buffer. In implementations, the reorder buffer entry is coordinated between the vector pipeline and the reorder buffer. In implementations, the primary pipeline is further configured to rename the micro-operation when the instruction is a scalar instruction, dispatch the renamed micro-operation for execution, and execute the dispatched micro-operation.

Described herein is a method which includes decoding, by a primary pipeline, a micro-operation from an instruction, creating, by the primary pipeline, e a reorder buffer entry in a reorder buffer for the micro-operation, responsive to a determination that the instruction is a vector instruction, sending the micro-operation to a vector pipeline, responsive to a determination that the instruction is a multiple register vector instruction, signaling a vector sequencer in a vector pipeline to decode a remaining micro-operations from the instruction, processing, by the vector pipeline, the micro-operation, and processing, by the vector pipeline, the remaining micro-operations when the instruction is the multiple register vector instruction.

With respect to the method, in implementations, the decoding, the creating, the sending, and the signaling is done by a decode unit in the primary pipeline. In implementations, the decode unit is sending the micro-operation to a vector renamer unit in the vector pipeline. In implementations, the decode unit is signaling a vector sequencer in the vector pipeline. In implementations, the method further includes foregoing, by the primary pipeline, renaming the micro-operation. In implementations, the method further includes foregoing, by the primary pipeline, decoding the remaining micro-operations when the instruction is the multiple register vector instruction. In implementations, the method further includes processing, by the primary pipeline, a vector configuration instruction to generate vector configuration information, wherein the processing of the micro-operation in the vector pipeline starts upon receipt of the vector configuration information. In implementations, the processing of the remaining micro-operations in the vector pipeline starts upon receipt of the vector configuration information when the instruction is the multiple register vector instruction. In implementations, where the processing, by the vector pipeline, the micro-operation further includes dispatching and executing, by the vector pipeline, the micro-operation, and where the processing, by the vector pipeline, the remaining micro-operations when the instruction is the multiple register vector instruction further includes dispatching and executing, by the vector pipeline, the remaining micro-operations when the instruction is the multiple register vector instruction. In implementations, the method further includes coordinating the reorder buffer entry between the primary pipeline, the vector pipeline, and the reorder buffer. In implementations, the method further includes coordinating the reorder buffer entry between the vector pipeline and the reorder buffer. In implementations, the method further includes renaming, in the primary pipeline, the micro-operation when the instruction is a scalar instruction, dispatching, in the primary pipeline, the renamed micro-operation for execution, and executing, in the primary pipeline, the dispatched micro-operation.

Described herein is a non-transitory computer readable medium comprising a circuit representation that, when processed by a computer, is used to program or manufacture an integrated circuit including a processor core including a primary pipeline and a vector pipeline. The primary pipeline decodes a micro-operation from an instruction, creates a reorder buffer entry in a reorder buffer for the micro-operation, responsive to a determination that the instruction is a vector instruction, sends the micro-operation to a vector pipeline, and responsive to a determination that the instruction is a multiple register vector instruction, signals the vector pipeline to decode a remaining micro-operations from the instruction. The vector pipeline processes the micro-operation and processes the remaining micro-operations when the instruction is the multiple register vector instruction.

With respect to the non-transitory computer readable medium comprising a circuit representation that, when processed by a computer, is used to program or manufacture an integrated circuit, in implementations, a decode unit in the primary pipeline is configured to send the micro-operation to the vector pipeline. In implementations, a decode unit in the primary pipeline is configured to send the micro-operation to a vector renamer unit in the vector pipeline. In implementations, the decode unit in the primary pipeline is configured to signal a vector sequencer in the vector pipeline. In implementations, a renamer unit in the primary pipeline foregoes renaming the micro-operation. In implementations, the decode unit in the primary pipeline foregoes decoding the remaining micro-operations when the instruction is the multiple register vector instruction. In implementations, the primary pipeline is further configured to process a vector configuration instruction to generate vector configuration information; and the vector pipeline is further configured to process the micro-operation upon receipt of the vector configuration information; and process the remaining micro-operations upon receipt of the vector configuration information when the instruction is the multiple register vector instruction. In implementations, the vector pipeline is further configured to dispatch and execute the micro-operation, and dispatch and execute the remaining micro-operations when the instruction is the multiple register vector instruction. In implementations, the reorder buffer entry is coordinated between the primary pipeline, the vector pipeline, and the reorder buffer. In implementations, the reorder buffer entry is coordinated between the vector pipeline and the reorder buffer. In implementations, the primary pipeline is further configured to rename the micro-operation when the instruction is a scalar instruction, dispatch the renamed micro-operation for execution, and execute the dispatched micro-operation.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:
   a primary pipeline configured to:
   decode only a first micro-operation from an instruction, wherein the instruction includes more than one micro-operation;
   create a reorder buffer entry in a reorder buffer for the first micro-operation;
   responsive to a determination that the instruction is a vector instruction, send the first micro-operation to a vector pipeline; and
   responsive to a determination that the instruction is a multiple register vector instruction, signal a vector pipeline to decode remaining micro-operations from the instruction; and
   the vector pipeline configured to:
   process the first micro-operation; and
   decode the remaining micro-operations when the instruction is the multiple register vector instruction such that the first micro-operation is decoded at the primary pipeline and the remaining micro-operations are decoded at the vector pipeline.

2. The integrated circuit of claim 1, wherein a decode unit in the primary pipeline is configured to send the first micro-operation to the vector pipeline.

3. The integrated circuit of claim 1, wherein a decode unit in the primary pipeline is configured to send the first micro-operation to a vector renamer unit in the vector pipeline.

4. The integrated circuit of claim 3, wherein the decode unit in the primary pipeline is configured to signal a vector sequencer in the vector pipeline.

5. The integrated circuit of claim 4, wherein a renamer unit in the primary pipeline foregoes renaming the first micro-operation.

6. The integrated circuit of claim 5, wherein the decode unit in the primary pipeline foregoes decoding the remaining micro-operations when the instruction is the multiple register vector instruction.

7. The integrated circuit of claim 6, wherein:
   the primary pipeline is further configured to process a vector configuration instruction to generate vector configuration information; and
   the vector pipeline is further configured to:
   process the first micro-operation upon receipt of the vector configuration information; and
   process the remaining micro-operations upon receipt of the vector configuration information when the instruction is the multiple register vector instruction.

8. The integrated circuit of claim 6, wherein the vector pipeline is further configured to:
   dispatch and execute the first micro-operation; and
   dispatch and execute the remaining micro-operations when the instruction is the multiple register vector instruction.

9. The integrated circuit of claim 1, wherein the reorder buffer entry is coordinated between the primary pipeline, the vector pipeline, and the reorder buffer.

10. The integrated circuit of claim 1, wherein the reorder buffer entry is coordinated between the vector pipeline and the reorder buffer.

11. The integrated circuit of claim 1, wherein the primary pipeline is further configured to:
    rename the first micro-operation when the instruction is a scalar instruction;
    dispatch the renamed micro-operation for execution; and
    execute the dispatched micro-operation.

12. A method comprising:
    decoding, by a primary pipeline, only a first micro-operation from an instruction, wherein the instruction includes more than one micro-operation;
    creating, by the primary pipeline, a reorder buffer entry in a reorder buffer for the first micro-operation;
    responsive to a determination that the instruction is a vector instruction, sending the first micro-operation to a vector pipeline;
    responsive to a determination that the instruction is a multiple register vector instruction, signaling a vector sequencer in a vector pipeline to decode remaining micro-operations from the instruction;

processing, by the vector pipeline, the first micro-operation; and decoding, by the vector pipeline, the remaining micro-operations when the instruction is the multiple register vector instruction such that the first micro-operation is decoded at the primary pipeline and the remaining micro-operations are decoded at the vector pipeline.

13. The method of claim 12, wherein the decoding, the creating, the sending, and the signaling is done by a decode unit in the primary pipeline.

14. The method of claim 13, wherein the decode unit is sending the first micro-operation to a vector renamer unit in the vector pipeline.

15. The method of claim 14, wherein the decode unit is signaling a vector sequencer in the vector pipeline.

16. The method of claim 15, further comprising:
foregoing, by the primary pipeline, renaming the first micro-operation; and
foregoing, by the primary pipeline, decoding the remaining micro-operations when the instruction is the multiple register vector instruction.

17. The method of claim 12, further comprising:
processing, by the primary pipeline, a vector configuration instruction to generate vector configuration information, wherein the processing of the first micro-operation in the vector pipeline starts upon receipt of the vector configuration information.

18. The method of claim 17, wherein the processing of the remaining micro-operations in the vector pipeline starts upon receipt of the vector configuration information when the instruction is the multiple register vector instruction.

19. The method of claim 18:
wherein the processing, by the vector pipeline, the first micro-operation further comprises:
dispatching and executing, by the vector pipeline, the first micro-operation; and
wherein the processing, by the vector pipeline, the remaining micro-operations when the instruction is the multiple register vector instruction further comprises:
dispatching and executing, by the vector pipeline, the remaining micro-operations when the instruction is the multiple register vector instruction.

20. A non-transitory computer readable medium comprising a circuit representation that, when processed by a computer, is used to program or manufacture an integrated circuit comprising:
a processor core including a primary pipeline and a vector pipeline, wherein the primary pipeline:
decodes only a first micro-operation from an instruction, wherein the instruction includes more than one micro-operation;
creates a reorder buffer entry in a reorder buffer for the first micro-operation;
responsive to a determination that the instruction is a vector instruction, sends the first micro-operation to a vector pipeline; and
responsive to a determination that the instruction is a multiple register vector instruction, signals the vector pipeline to decode remaining micro-operations from the instruction; and
wherein the vector pipeline:
processes the first micro-operation; and
decodes the remaining micro-operations when the instruction is the multiple register vector instruction such that the first micro-operation is decoded at the primary pipeline and the remaining micro-operations are decoded at the vector pipeline.

* * * * *